P. W. PRATT.
WEAR RESISTING AND NON-SLIPPING TREAD.
APPLICATION FILED MAR. 7, 1910.

962,719.

Patented June 28, 1910.

Witnesses:
H. L. Allen

Inventor:
Philip W. Pratt
by Wright, Brown, Quinby & May
Attys.

UNITED STATES PATENT OFFICE.

PHILIP WATSON PRATT, OF BOSTON, MASSACHUSETTS.

WEAR-RESISTING AND NON-SLIPPING TREAD.

962,719.  Specification of Letters Patent.  Patented June 28, 1910.

Application filed March 7, 1910. Serial No. 547,663.

*To all whom it may concern:*

Be it known that I, PHILIP W. PRATT, of Boston, in the county of Suffolk and State of Massachusetts, have invented certain new and useful Improvements in Wear-Resisting and Non-Slipping Treads, of which the following is a specification.

This invention relates to treads for boot and shoe heels and soles, crutch tips and the like, in which a relatively thick and rigid body composed of textile fabric is associated with and backed by a body of yielding elastic material, such as rubber. The relatively rigid body, which, for convenience, I will hereinafter term the tread piece, is composed of textile fabric, such as cotton duck or canvas, having its surfaces frictioned or provided with coatings of unvulcanized rubber or rubber cement, the material being manipulated in such manner that a sheet or strip of it is converted into a relatively thick tread piece adapted to be secured to a layer or body of unvulcanized rubber which constitutes a backing for a tread piece, the tread face of the tread piece being roughened or corrugated by pressure imparted by a suitable molding surface or surfaces adapted to form alternating indentations and projections on the said tread face, said pressure being imparted while the frictioning material applied to the fabric is unvulcanized and plastic, and the tread piece is adapted to retain the form imparted to it by the molding instrumentalities. The molded or corrugated tread piece is incorporated in a body of unvulcanized rubber which forms a backing for the same, and the whole is then vulcanized to firmly unite the tread piece to the rubber body and solidify the tread face and make its corrugations permanent.

Figure 1:
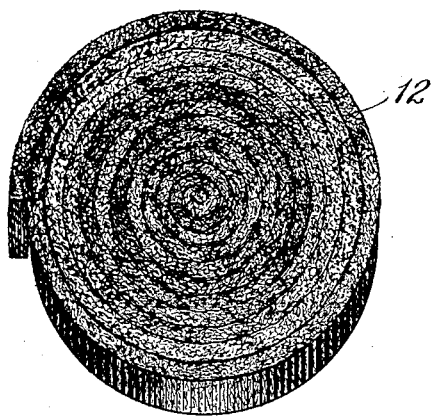
Figure 2:
Figure 4:
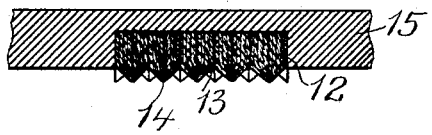
Figure 3:
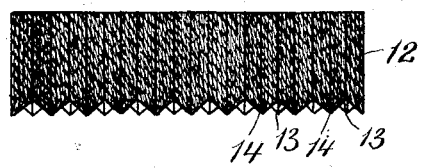

Of the accompanying drawings, forming a part of this specification, Figure 1 represents a perspective view of a tread piece composed of a strip of frictioned fabric coiled spirally. Fig. 2 represents a sectional view of the tread piece shown in Fig. 1 before the corrugating operation. Fig. 3 represents a sectional view showing the tread piece with its tread face corrugated. Fig. 4 represents a sectional view showing the corrugated tread piece incorporated into a rubber body.

The same reference characters indicate the same parts in all the figures.

12 represents a tread piece composed of a frictioned strip of textile material. This strip may be produced by taking a frictioned sheet of duck or canvas rolled to form a compact body while the frictioning material is unvulcanized, the roll being then cut in sections of the desired thickness to produce tread pieces containing strands, the free ends of which may be formed into converging groups. The outer face of the tread piece 12 is then subjected to pressure by a suitable molding face or die which corrugates the said face by forming alternating depressions 13 and projections 14, these being of any suitable form. This causes the ends of some of the strands to be drawn toward the point of each projection. In other words, the series or group of strands or threads of fabric in each projection 14, converge toward the tip of the projection, whereby the tips of the projections possess different characteristics from the body of the tread piece. Each projection has, of course, a more or less laterally condensed tip, the ends of the threads or strands being, of course, laterally condensed or compressed. The result is that there is much less liability of slipping when the tread piece is new, since the numerous tips of condensed threads and rubber present points which are somewhat harder than the body of the tread piece.

15 represents a rubber body to which the tread piece 12 is secured while the rubber and frictioning material is unvulcanized, the tread piece being here shown as pressed into the rubber body. The whole structure is then vulcanized to unite the tread piece to the rubber body and render the form of each permanent. The vulcanizing process renders the tread piece relatively rigid and renders the form of the corrugations permanent, so that the tread piece presents numerous faces standing at different angles and with thread ends terminating at those faces, the anti-slipping quality possessed by the frictioned fabric built up into a relatively thick plug being thus materially increased.

Heretofore, a plug of this character has had a practically flat tread surface devoid of alternating projections and recesses. While this surface is to a certain extent free from liability to slip when somewhat worn, I have found by corrugating it as described, it is adapted to cling more tenaciously to a slippery surface, especially when new, thus adding to the security of the user.

It will be seen that in a tread piece so constructed, there are threads or strands which are presented endwise at the bottom face of the piece and which are more or less condensed lengthwise according to their positions relatively to the apexes of the projections; that is, those threads whose ends are at the bottom of the recesses are more shortened and condensed than those whose ends are at the apexes of the projections, while those whose ends are at the inclined sides of the projections are in an intermediate condition of density. The sides of the projections face or incline in different directions and consequently present threads which are more or less condensed so that their ends are at such angles to the surfaces of the inclines as to afford the best opposition to slipping on the surface on which the tread piece bears.

I claim:

A tread piece comprising a body of frictioned textile fabric, the bottom or tread face having a multiplicity of projections each of which has a series or group of strands or threads of the fabric converging at the tip of the projection, whereby the tips of the projections possess different characteristics from the body of the tread piece.

In testimony whereof I have affixed my signature, in presence of two witnesses.

PHILIP WATSON PRATT.

Witnesses:
C. F. BROWN,
A. W. HARRISON.